United States Patent

Sogabe et al.

[11] Patent Number: 5,126,608
[45] Date of Patent: Jun. 30, 1992

[54] MOTOR HOUSING WITH INTEGRALLY MOLDED ELECTRIC CONNECTOR

[75] Inventors: Masatoyo Sogabe; Kanemas Okuda; Hiroyuki Uchida; Masashi Nishina; Tomonaga Yamamoto, all of Yamanashi, Japan

[73] Assignee: Fanuc Ltd, Yamanashi, Japan

[21] Appl. No.: 640,438
[22] PCT Filed: May 24, 1990
[86] PCT No.: PCT/JP90/00664
§ 371 Date: Jan. 16, 1991
§ 102(e) Date: Jan. 16, 1991
[87] PCT Pub. No.: WO90/14708
PCT Pub. Date: Nov. 29, 1990

[30] Foreign Application Priority Data

May 24, 1989 [JP] Japan .................. 1-128673

[51] Int. Cl.⁵ .................. H02K 5/22; H01R 27/00
[52] U.S. Cl. .................. 310/71; 310/89; 439/926
[58] Field of Search .................. 310/43, 71, 89; 439/200, 203, 204, 322, 676, 701, 926

[56] References Cited

U.S. PATENT DOCUMENTS

| | | | |
|---|---|---|---|
| 3,350,586 | 11/1967 | Otto | 310/71 |
| 4,104,550 | 8/1978 | Penhorwood | 310/71 |
| 4,333,026 | 6/1982 | Bock et al. | 310/42 |
| 4,572,979 | 2/1986 | Haar et al. | |
| 4,727,274 | 2/1988 | Adam et al. | 310/71 |
| 4,866,317 | 9/1989 | Katayama | 310/71 |
| 4,937,482 | 6/1990 | Dohogne | 310/71 |

FOREIGN PATENT DOCUMENTS 2449996 10/1979 France .
59-80135 5/1984 Japan .

Primary Examiner—Steven L. Stephan
Assistant Examiner—D. L. Rebsch
Attorney, Agent, or Firm—Armstrong, Nikaido, Marmelstein, Kubovcik and Murray

[57] ABSTRACT

A motor housing structure with an integrally molded electric connector comprises a front flange (26) and a molded rear housing (28) fixed respectively to the front and rear ends of the core (12) of the stator (10) of a motor, and supports a rotor (20) for rotation in rotary bearings (30, 32) held respectively on the front flange (26) and the molded rear housing (28) with a gap between the inner circumference of the stator (10) and the outer circumference of the rotor (20). The front flange (26) is formed of a metal and the rear housing (28) is formed as a lightweight resin member, by molding. An electric connector unit (40), to which an external electric connector (50) is connected to supply electric drive current to the motor, is formed integrally with the molded rear housing (28). The external electric connector (50) is plugged into the electric connector unit (40) in a direction along the axis of the motor, to electrically connect the external electric connector (50) to the electric connector unit (40).

5 Claims, 3 Drawing Sheets

MOTOR HOUSING WITH INTEGRALLY MOLDED ELECTRIC CONNECTOR

TECHNICAL FIELD

The present invention relates to an industrial motor for use as a rotative drive source for driving a machine tool or the like and, more particularly, to a housing structure for a motor having a portion formed by molding a resin and integrally provided with a primary portion of an electric connector to enable a supply of an electric drive current to the motor.

BACKGROUND ART

An industrial motor widely used as a rotative drive source for machine tools and other industrial machines has a construction including a laminated stator core with an outer circumference serving as the casing for the motor, a stator formed by inserting excitation coils in the laminated stator core, a front housing joined to the front end of the laminated stator core, a rear housing joined to the rear end of the laminated stator core, rotary bearings fitted in holes in the front and rear housings, and a rotor supported for rotation in the rotary bearings within the bore of the stator, with a gap between the outer circumference of the rotor and the inner circumference of the stator.

Such an industrial motor is formed, by taking into consideration that the industrial motor is mostly subjected to severe running conditions due to a continuous long operation thereof, in a construction having sufficient mechanical strength by forming the principal components from metal, particularly, the front and rear housings joined respectively to the front and rear ends of the stator core, in addition a means for transmitting and dispersing heat generated by copper loss and iron loss when an electric drive current is supplied to the exciting coils is incorporated to thereby prevent damage to and a reduction in the life of the motor due to an increase in the temperature of the motor to a high level. A motor having a greater output generates a greater amount of heat, and thus a metallic housing having a high heat conductivity is essential to a large-capacity industrial motor, so as to prevent burning the excitation coils. On the other hand; power, i.e., the excitation current, is supplied to an industrial motor having such a metallic housing, in, most cases, by electrically connecting an electrical connector (for example, a male electric connector) at the extremity of a power supply cable to a female electric connector screwed to a connector base projecting outward from a portion of the metallic rear housing of the motor.

FIG. 4 shows an example industrial motor provided with a conventional housing structure. This conventional industrial motor is constructed by joining a metallic front flange 3 and a rear housing 4 respectively to the front and rear ends of the core 2 of a stator 1, disposing a rotor (not shown) inside the stator 1 with its output shaft 5 projecting to the front from the front flange 3 so as to be connected mechanically to a driven member by a coupling or the like, and joining a cover 6 to the rear end of the rear housing 4 so as to cover the rear end of the motor. A connector base 7 is formed on the rear housing 4 so as to protrude radially outward from the outer circumference of the rear housing 4. An off-the-shelf electrical connector 8 is fastened to the connector base 7 by screws 9.

Such a construction provided with the electrical connector screwed to the connector base of the metallic housing requires a process for attaching the electrical connector 8 to the connector base 7 using screws 9 by hand during the fabrication of the motor.

Furthermore, when the motor is intended for use as the rotative drive source of a machine tool, a packing 9' is placed between the electric connector 8 and the connector base 7 to prevent wetting the interior of the motor with machining liquid splashed out during the operation of the machine tool. The electrical connector 8 is fastened to the connector base 7 by the screws 8, and then the junction of the electric connector 8 and the connector base 7 is coated with a sealing grease to prevent moisture leakage into the motor. Thus, the motor manufacturing process requires an excessive amount of work, which is an impediment to any desired cost reduction.

Furthermore, although the construction having the connector base 7 projecting from the outer circumference of the metallic rear housing 4 is intended to reduce costs through the employment of the available electrical connector 8, the connector base 7 radially projecting from the outer circumference of the housing increases the overall size of the enveloping surface of the motor including the top of the connector base 7. Thus, the motor requires a relatively large space for installation on a machine tool or the like.

On the other hand, the conditions for dispersing heat generated by copper loss and iron loss are not very severe with an industrial motor having a comparatively small output capacity. The rear housing need not necessarily be formed from metal but may be formed from a resin, in view of forming a motor having a lightweight construction, provided that only the front flange is formed from metal, to ensure satisfactory heat conduction and sufficient mechanical strength for supporting the output shaft and for coupling the output shaft and the driven member.

DISCLOSURE OF THE INVENTION

Accordingly, a principal object of the present invention is to provide a motor housing structure capable of solving the forgoing problems.

Another object of the present invention is to provide an industrial motor having a construction, including a rear housing formed by molding a resin and having a portion integrally provided with an electrical connector incorporated therein by molding.

To achieve the foregoing objects, the present invention provides a motor housing structure with an integrally molded electrical connector, including a front flange fixed to the front end of the stator core of the motor and a rear housing fixed to the rear end of the stator core. The rear housing rotatably support a rotor shaft mounted with the rotor of the motor disposed inside the stator with a gap between the circumference of the rotor and the inner circumference of the stator, and on rotary bearings held on the front flange and the rear housing.

The front flange is formed from metal and has a front surface from which the output shaft of the motor formed in the extremity of the rotor shaft projects outside to the front.

The rear housing is formed by molding a resin, and is provided in one portion thereof with a hollow bulge forming an electric connector means integrally incorporated in the portion to supply electrical drive current to the motor therethrough.

When molding the thus molded rear housing of the motor housing structure, the primary portion of the electrical connector is molded integrally with the rear housing. Therefore, a locking mechanism for holding an external electrical connector in place and an external electrical connector guide groove for guiding the external electrical connector so that the external electrical connector can be correctly received in the electrical connector means in a given position can both be formed when molding the rear housing. Therefore, the motor housing structure does not need a sealing structure and the work needed for screwing the component parts of the electric connector can be eliminated.

BRIEF DESCRIPTION OF THE DRAWINGS

The above and other objects, features and advantages of the present invention will become more apparent from the following description taken in connection with the accompanying drawings, in which.

BEST MODE OF CARRYING OUT THE INVENTION

Figure 1:
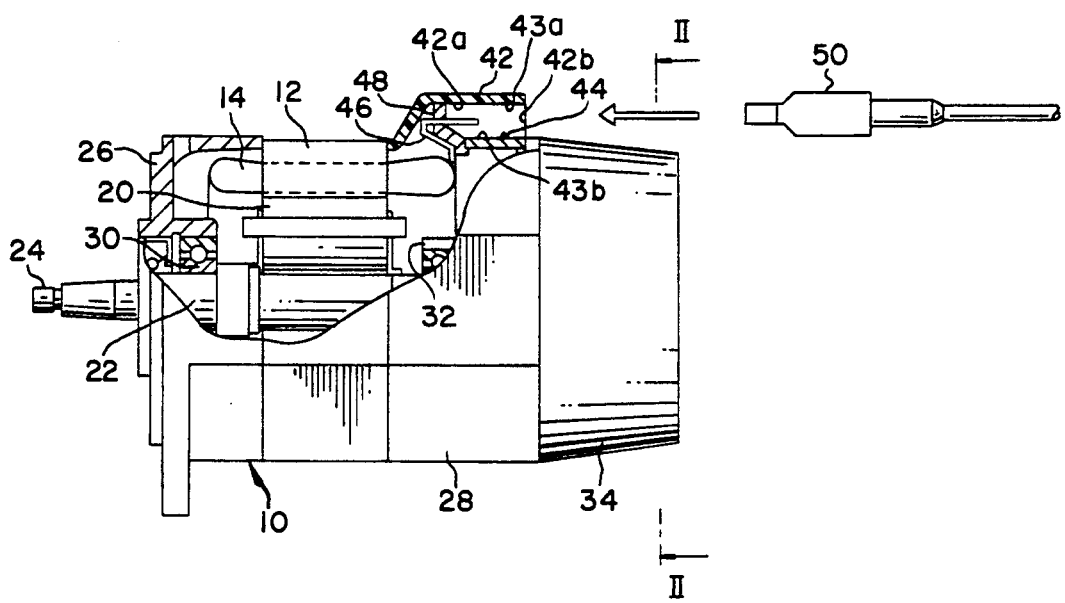
FIG. 1 is a partially cutaway front elevation of a motor with a molded housing having an integrally molded electric connector in a preferred embodiment according to the present invention.
Figure 2:
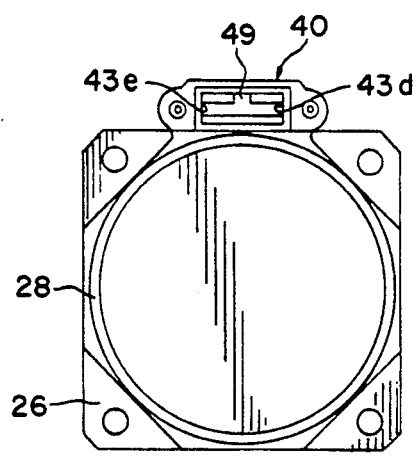
FIG. 2 is a side elevation of the motor shown in FIG. 1.

An industrial motor shown in FIG. 1 is a servomotor embodying the present invention. The servomotor has a stator 10 and a rotor 20 disposed in the central bore of the stator 10 with a gap between the inner circumference of the stator 10 and the outer circumference of the rotor 20. The stator 10 incorporates a stator core 12 and excitation coils 14, and the rotor 20 has a rotor shaft 22 extended in its central portion thereof. The front end 24 of the rotor shaft 22 is formed as an output shaft projecting to the front, and a metallic flange 26 having the shape of a bell jar is fastened to the front end of the stator core 12 by screw bolts, not shown. A molded resin rear housing 28 formed by molding a resin is fastened to the rear end of the stator core 12 by screw bolts. The rotor shaft 22 is supported rotatably in rotary bearings 30 and 32 fitted in the respective central portions of the front metallic flange 26 and the molded rear housing 28, respectively. This construction enables the rotor 20 to rotate inside the stator 10, and a cover 34 is attached by suitable attaching means, such as screws or an adhesive, to the rear end of the molded rear housing 28. A rotation detector, not shown, is housed in the cover 34 for detecting the rotation of the output shaft of the servomotor.

According to the present invention, the molded rear housing 28 is formed of a heat-resistant resin material having a satisfactory moldability and capable of ensuring a sufficient mechanical strength for moldings, using a well-known molding process with an injection molding machine. The molding process is able to form the molded rear housing 28 with a high degree of accuracy and is able to form an electrical connector unit 40 integrally with the molded rear housing 28, whereas the conventional metallic rear housing is provided integrally with only a connector base. The electric connector unit 40 incorporates a molded bulge 42 formed in one portion of the molded rear housing 28 and internally defining a connector socket 42a that has an opening 42b opening in the axial direction of the motor, conductive pins 46 provided in the connector receiving socket 42a and electrically connected to the excitation coils 14 of the stator 10, and a separate base wall 48 holding the conductive pins 46.

An external electrical connector 50 schematically illustrated by broken lines in FIG. 1 is plugged into the connector socket 42a to connect the external electrical connector electrically to the conductive pins 46.

The connector socket 42a is defined within the bulge 42 by an upper wall 43a, a lower wall 43b and side walls 43d and 43e, and has a substantially rectangular cross section.

The electrical connector unit 40 integrally formed with the molded rear housing 28 can be completed by attaching the molded rear housing 28 to the rear end of the stator core 12 when assembling the motor. A locking projection 44 formed on the lower wall 43b to lock the external electric connector 50 in place and a guide groove 49 formed in the upper wall 43a defining the connector socket 42a so as to guide a projection formed on the outer surface of the external electric connector 50 together enable the external electric connector 50 to be firmly plugged into the connector socket 42a in a correct position relative to the electric connector unit 40. This prevents wrong connections of the electrical connector unit 40 and the external electrical connector 50, and consequently, the conductors of the external electrical connector 50 for different phases can be correctly connected to the corresponding conductors of the electrical connector of the electrical connector unit 40 connected to the excitation coils 14 for different phases, respectively, without fail.

Since the external electrical connector 50 can be inserted deeply into the socket 42a of the electrical connector unit 40, an effective internal water-proof sealing, hitherto obtained by a packing, can be obtained by providing a sealing structure on the inner surface of the socket 42a and on the outer surface of the external electrical connector 50.

The molded rear housing 28 formed of a resin reduces the weight of the motor. The electrical connector unit 40 integrally formed with the molded rear housing 28 and having the socket receiving the external electric connector 50 in a direction parallel to the axis of the motor reduces the size of the enveloping surface of the motor, when compared with that of the enveloping surface of the conventional motor provided with the projecting connector base. Thus, the motor can be formed in a compact construction. Accordingly, the motor requires a relatively small space for installation when operatively connecting the motor with the driven unit of a machine tool or the like.

Although the invention has been described as applied to a servomotor, naturally the present invention is not limited thereto in a practical application. When the present invention is embodied in an industrial motor (for example, an induction motor having a comparatively small output capacity) a bulge having a socket is formed in a portion of the rear housing when forming the rear housing by molding a resin, and conductors are fixedly provided in the socket to construct a motor housing structure having an integrally molded electrical connector similar to that described above.

Figure 3:
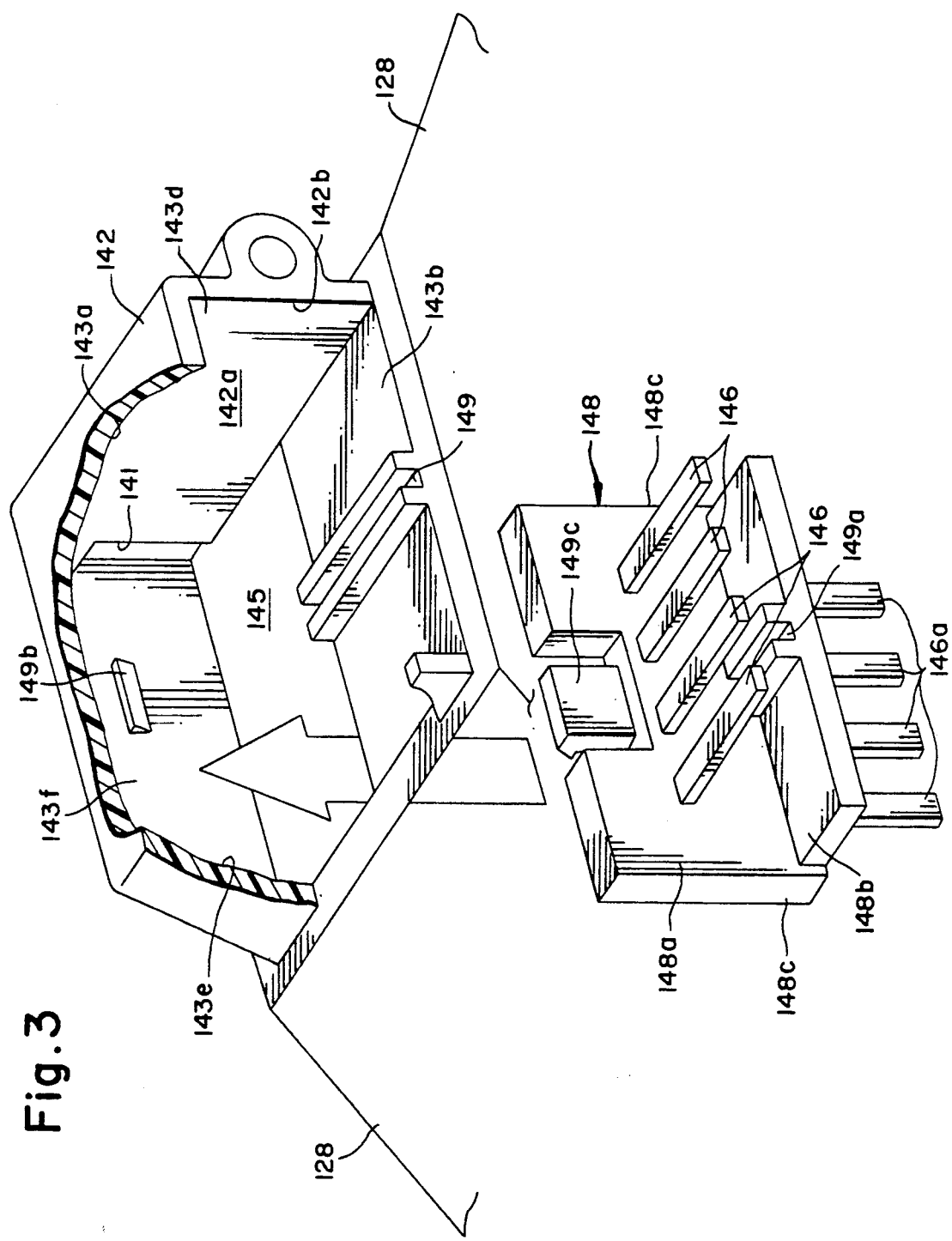
FIG. 3 is an exploded perspective view of a molded rear housing included in a motor housing in another embodiment according to the present invention.
Figure 4:
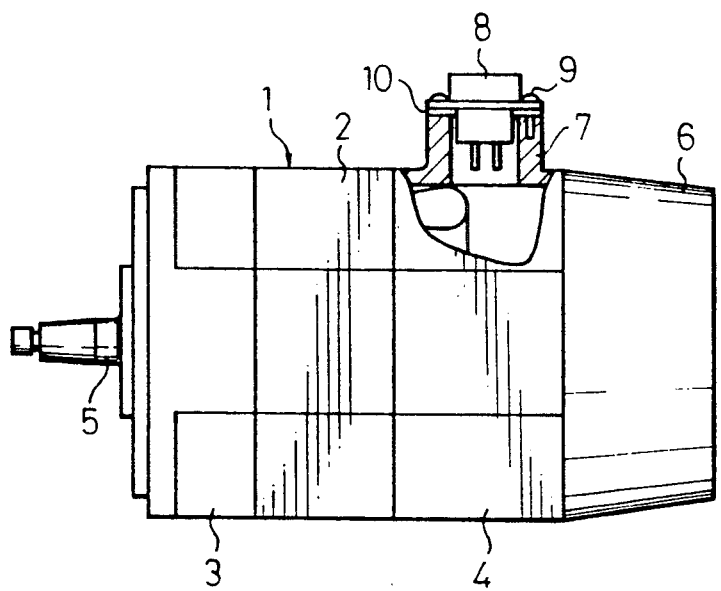
FIG. 4 is a partially sectional front elevation of a conventional industrial motor and a connector structure incorporated into the same industrial motor.

FIG. 3 is a perspective view of a motor housing structure in another embodiment according to the present invention.

A molded rear housing 128 included in the motor housing structure shown in FIG. 3 is provided integrally with a hollow bulge 142 formed in molding the same. The bulge 142 has an upper wall 143a, a lower wall 143b opposite the upper wall 143a, opposite side walls 143d and 143e, and an end wall 143f. The upper wall 143a, the lower wall 143b and the side walls 143d and 143e define a socket 142e extending in a direction along the axis of the motor and having an opening 142b. An open 145 opening into the interior of the molded rear housing 128 is formed in the inner portion of the lower wall 143b. When assembling the motor, a holding member 148 holding conductive pins 146 is inserted upward in the opening 145 so that an elastic hook 149c formed in the middle portion of the upper end of a vertical section 148a of the holding member 148 engages a catch 149b formed on the inner surface of the end wall 143f, to hold the holding member 148 in place on the end wall 143f. The opposite side portions of the vertical section 148c are received respectively in grooves 141 formed in the side walls 143d and 143e (only one of the grooves 141 formed in the side wall 143d is shown), and thus the holding member 148 is secured to the bulge 142. When secured to the bulge 142, the upper surface of a lower horizontal section 148b of the holding member 148 is flush with the upper surface of the lower wall 143b of the bulge 142, and a guide groove 149a formed on the upper surface of the lower horizontal section 148b is aligned with a guide groove 149 formed on the upper surface of the lower wall 143b. In this state, the conductive pins 146 are held horizontally in the socket 142a, so as to be electrically connected to an external electrical connector when the external electrical connector is plugged in the socket 142a. The lower ends 146a of the conductive pins 146 are electrically connected to the excitation coils, not shown, of the stator of the motor within the molded rear housing 128 by connecting means such as soldering or caulking. A locking projection similar to the locking projection 44 of the first embodiment may be formed on the side wall 143d or 143e of the bulge 142, by molding.

As will be understood from the foregoing description of the two embodiment, in accordance with the present invention, a rear housing for industrial motors including a servomotor is formed by molding a resin. The molded rear housing is integrally provided with an electrical connector through which an electrical drive current is supplied to the motor. Accordingly, a process for mounting an electrical connector on the rear housing by screws can be omitted, to thereby reduce the steps of the motor manufacturing process, enable cost reductions and allow the use of a locking mechanism, of a protective mechanism to prevent wrong connection of an external electric connector, and of a water-proof sealing mechanism having improved structual abilities for a functional improvement of the structure of the motor.

It should be noted that many modifications and variations of the present invention may occur without departing from the scope of the invention as defined by the appended claims.

We claim:

1. A motor housing structure with an integrally molded electrical connector, comprising:

a front flange fixed to a front end of a core of a stator of a motor, said front flange rotatably supporting via rotary bearings a rotor shaft that has a rotor of the motor mounted thereon to be positioned inside the stator via a gap extending between an outer circumference thereof and an inner circumference of the core of the stator; and a rear housing fixed to a rear end of the core, the rotary bearings being held by said front flange and said rear housing, wherein said front flange is formed from metal and is provided with a front surface from which an output shaft of the motor positioned in a front end of the rotor shaft is outwardly projected out a front of the motor, and said rear housing includes a molded housing formed by molding a resin, the molded housing being provided at a portion of said rear housing with a hollow bulge, and an electrical connector means formed in said hollow bulge, for supplying an electrical drive current to the motor, the electrical connector means formed integrally with the molded housing including wall means for defining a socket that receives an external electrical connector, the wall means defining a first opening in a direction along an axis of the output shaft of the motor and outside an outer peripheral wall of said rear housing, the wall means further defining a second opening between the socket and an interior of said rear housing, and conductive pin means electrically connected to the stator of the motor, for electrically connecting with an external electrical connector through the first opening when the external electrical connector is plugged into the socket, said conductive pin means having a holding element so as to be operatively insertable through the second opening into the socket from the interior of said rear housing so as to be connectable with the external electrical connector.

2. A motor housing structure with an integrally molded electrical connector adding to claim 1, wherein the wall means of the electrical connector means is provided with an upper wall, a lower wall opposite the upper wall, and a pair of mutually facing side walls.

3. A motor housing structure with an integrally molded electrical connector according to claim 2, wherein the wall means of the electrical connector means is further provided with an innermost holding wall for holding the conductive pin means.

4. A motor housing structure with an integrally molded electrical connector according to claim 2, wherein at least one of the upper or lower walls is provided with a guide groove for guiding the external electrical connector when the external electrical connector is plugged into the socket.

5. A motor housing structure with an integrally molded electrical connector according to claim 3, wherein the innermost holding wall is provided with a catch formed integrally therewith and operatively engageable with an elastic hook formed in the holding element of the conductive pin means.

* * * * *